United States Patent
Wimmer et al.

(10) Patent No.: US 10,442,130 B2
(45) Date of Patent: Oct. 15, 2019

(54) METHOD FOR PRODUCING A FIBRE COMPOSITE MOULDED PART, AND A FIBRE COMPOSITE MOULDED PART

(71) Applicants: BAYERISCHE MOTOREN WERKE AKTIENGESELLSCHAFT, Munich (DE); GELITA AG, Eberbach (DE)

(72) Inventors: Siegfried Wimmer, Feldkirchen (DE); Matthias Reihmann, Hemsbach (DE)

(73) Assignees: BAYERISCHE MOTOREN WERKE AKTIENGESELLSCHAFT, Munich (DE); GELITA AG, Eberbach (DE)

( * ) Notice: Subject to any disclaimer, the term of this patent is extended or adjusted under 35 U.S.C. 154(b) by 87 days.

(21) Appl. No.: 15/525,357

(22) PCT Filed: Oct. 19, 2015

(86) PCT No.: PCT/EP2015/074121
§ 371 (c)(1),
(2) Date: May 9, 2017

(87) PCT Pub. No.: WO2016/074884
PCT Pub. Date: May 19, 2016

(65) Prior Publication Data
US 2017/0348894 A1     Dec. 7, 2017

(30) Foreign Application Priority Data
Nov. 14, 2014    (DE) .......... 10 2014 223 271

(51) Int. Cl.
*B29C 51/00* (2006.01)
*B29C 51/08* (2006.01)
(Continued)

(52) U.S. Cl.
CPC ............ *B29C 51/002* (2013.01); *B29C 51/08* (2013.01); *B29C 51/145* (2013.01); *B29C 70/34* (2013.01);
(Continued)

(58) Field of Classification Search
CPC ..... B29C 51/08; B29C 51/145; B29C 70/467; B29C 51/002; B29C 70/34;
(Continued)

(56) References Cited

U.S. PATENT DOCUMENTS 1,842,544  A  *  1/1932  Freuder .................... C08K 3/26
                                                    106/136.1
3,411,972  A  *  11/1968  Salyer .................... C08L 89/06
                                                    156/336

(Continued)

OTHER PUBLICATIONS

Gelatin:Film:Photography, May 14, 2015.*
(Continued)

*Primary Examiner* — Camie S Thompson
(74) *Attorney, Agent, or Firm* — Lewis Brisbois Bisgaard & Smith LLP; Craig Mueller

(57) ABSTRACT

The invention relates to a method for producing a fiber composite molded part. The method includes the steps of i) applying a gelatine-containing matrix material onto a fiber material, ii) deforming the fiber material provided with matrix material, and iii) curing the fiber material provided with matrix material.

12 Claims, 1 Drawing Sheet

(51) Int. Cl.
*B29C 70/46* (2006.01)
*B29C 51/14* (2006.01)
*B29K 307/04* (2006.01)
*B29C 70/34* (2006.01)
*B29K 101/10* (2006.01)
*B29K 105/12* (2006.01)

(52) U.S. Cl.
CPC ........ *B29C 70/467* (2013.01); *B29K 2089/00* (2013.01); *B29K 2101/10* (2013.01); *B29K 2105/12* (2013.01); *B29K 2307/04* (2013.01); *B29K 2995/006* (2013.01)

(58) Field of Classification Search
CPC ............ B29K 2089/00; B29K 2105/12; B29K 2307/04; B29K 2995/006; C08L 89/06
USPC ......... 156/336; 525/54.1; 530/354; 435/273; 428/292.1; 106/135.1
See application file for complete search history.

(56) References Cited

U.S. PATENT DOCUMENTS

2003/0143366 A1    7/2003   Foley
2015/0105863 A1*   4/2015   Zussman ................ A61L 27/52
                                                         623/23.72

OTHER PUBLICATIONS

International Search Report prepared by the European Patent Office dated Jan. 13, 2016, for International Application No. PCT/EP2015/074121.

Y.Z. Wan et al: "Carbon fiber-reinforced gelatin composites. I. Preparation and mechanical properties", Journal of Applied Polymer Science, vol. 75, No. 8, Feb. 22, 2000, pp. 987-993, XP055240556.

* cited by examiner

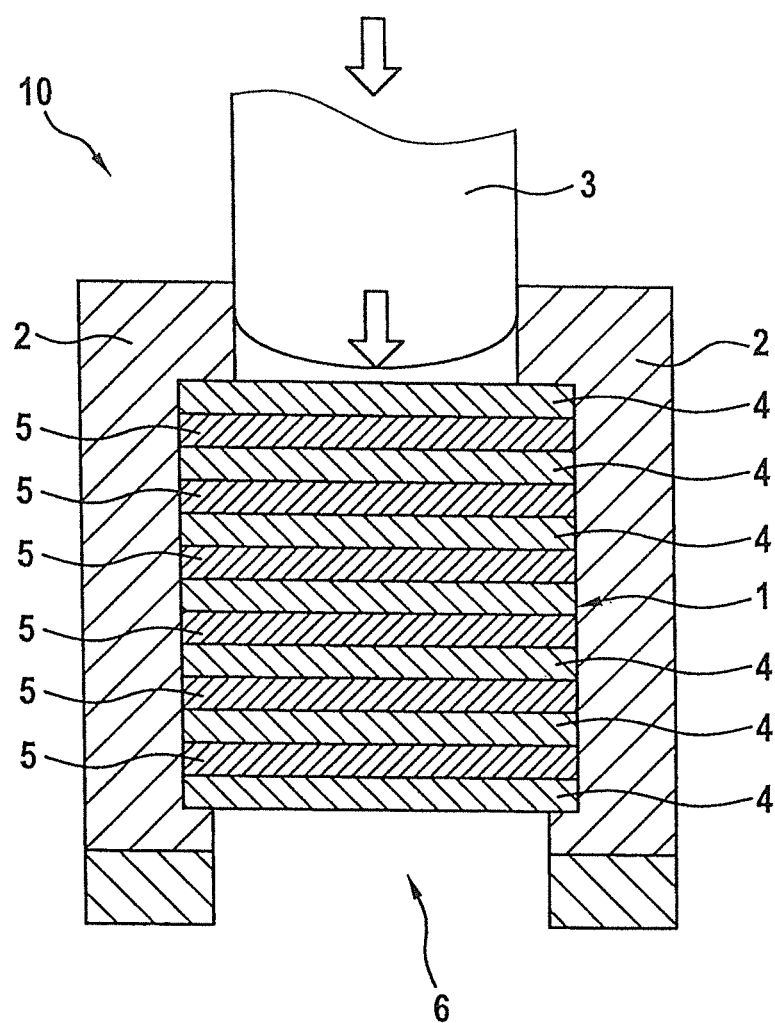

METHOD FOR PRODUCING A FIBRE COMPOSITE MOULDED PART, AND A FIBRE COMPOSITE MOULDED PART

CROSS REFERENCE TO RELATED APPLICATIONS

This application is a national stage application under 35 U.S.C. 371 and claims the benefit of PCT Application No. PCT/EP2015/074121 having an international filing date of 19 Oct. 2015, which designated the United States, which PCT application claimed the benefit of German Patent Application No. 10 2014 223 271.6 filed 14 Nov. 2014, the disclosure of each of which are incorporated herein by reference.

The present invention relates to a method for producing a fibre composite moulded part using materials which have been obtained in a sustainable manner, as well as to a fibre composite moulded part which contains a matrix material consisting of renewable raw materials.

Fibre composite moulded parts are known from the prior art in various forms. Owing to their high mechanical stability, their strength and stiffness with a low intrinsic weight, fibre composite moulded parts have multiple uses in automotive engineering and aircraft construction. Typically, fibre composite moulded parts are produced from fibre materials which are impregnated with a matrix material, in most cases a synthetic polymer, deformed and then cured. The most conventionally used matrix materials or resins are poorly biodegradable owing to their synthetic nature, which renders recycling of the fibre composite moulded parts and production waste more difficult and calls into question the use thereof for environmental protection reasons.

Proceeding from this prior art, the object of the present invention is to provide a method for producing a fibre composite moulded part which can be implemented simply using renewable raw materials and is safe to use. A further object of the present invention is to provide an environmentally friendly fibre composite moulded part produced in a sustainable manner, and also a use for gelatine.

The object is achieved in a method for producing a fibre composite moulded part in accordance with the invention by the steps of i) applying a gelatine-containing matrix material onto a fibre material, ii) deforming the fibre material provided with matrix material, and iii) curing the fibre material provided with matrix material. The use of a gelatine-containing matrix material is particularly essential to the invention. The gelatine-containing matrix material contains, as a main component relative to the total weight of the matrix material, gelatine, including in particular photographic gelatine. In addition, further curable matrix materials can be used or optionally also additives such as curing agents or softening agents or the like can be added which facilitate the processing of the gelatine-containing matrix material. It is particularly preferred to use gelatine, and in particular photographic gelatine, as the sole matrix material. Gelatine is a hydrolysed collagen, consists of different protein chains and is produced during the slaughtering of animals. Animals are mainly slaughtered for their food (meat production) and not to obtain by-products, e.g. animal fats, meat bone meal or even gelatine. Gelatine is thus considered to be a renewable raw material, is well-tolerated from a dermatological point of view, is free of allergens and harmful substances and also has protective properties, which means that the impact on persons implementing the method is minimised. The method in accordance with the invention is thus user-friendly and harmless from a toxicology point of view.

Gelatine is effectively biodegradable which means that recycling or disposal is not problematic. Accumulating production waste can be disposed of in an extremely simple manner without costly purification. In addition, gelatine has further advantageous properties specific to the method. It has been shown that gelatine-containing matrix materials melt at relatively low temperatures of ca. 60° C. Therefore, an effective distribution of matrix material is quickly achieved in the mould used and also in the fibre material within short process cycle times with low outlay; this increases the homogeneity of the produced fibre composite moulded part with a low technical outlay. The subsequent curing step provides the fibre composite moulded part with its final shape. A further advantage of the use of gelatine-containing matrix material is also evident herein: setting or curing only requires a short reaction time compared with conventional matrix materials. Not least owing to the low raw material prices for gelatine, a fibre composite moulded part can be produced in a simple and cost-effective manner without a high technical outlay by the method in accordance with the invention.

The dependent claims contain advantageous developments and embodiments of the invention.

Depending upon the processing method, the gelatine-containing matrix material can be used in different forms. Preferred forms of gelatine are powder form, gelatine as a solution, as a dispersion or as a film. The forms of gelatine mentioned herein can be extremely effectively applied onto the fibre material in the desired amount. In a particularly preferred manner, a gelatine-containing matrix material is in the form of a film. The method in accordance with the invention is greatly simplified hereby. The films can already be cut to shape and size prior to being applied onto the fibre material, are dry and thus are easy to store. The production of a layered composite consisting of gelatine-containing film and fibre material layer prior to deformation is readily possible. The costly conversion of liquid matrix materials, such as e.g. in the case of resin injection or resin infiltration, is not necessary. The preliminary process steps can thus be performed more simply. The use of gelatine-containing films thus permits the production of a fibre composite moulded part with a constant level of high quality with short process times. Any additive matrix materials or additives can be integrated into the gelatine-containing film or deposited onto the surface thereof in a particularly effective manner. In addition, by providing the matrix material in the form of a film, a homogeneous distribution during the pressing process is ensured.

In a particularly advantageous manner, the gelatine-containing matrix material is applied onto the fibre material by alternating superimposed layers of fibre material layers and gelatine-containing layers. In an advantageous manner, the outer-lying layers are formed by gelatine-containing layers or films. Therefore, a layer stack consisting of fibre material layers and matrix material layers which is very easy to store is obtained. The process times can be further shortened by previously orienting the fibre material layers. Quality control of the fibre orientation prior to final shaping is thus also facilitated, which minimises material waste.

In principle, no limits are imposed on the shaping process and it includes conventional processes, as used e.g. in wet moulding or prepreg methods. In a particularly simple manner, deformation is performed by deep drawing. Conventional aluminium pressing moulds can be used, which means that the technical outlay is low.

A combination of the use of gelatine-containing films as matrix material with a conversion in a deep drawing method for shaping is advantageous because the production of the fibre composite moulded part can thus take place in a continuous process. It is not necessary to change tools. Furthermore, injection processes for e.g. resin injection or hand lay-up are not required. The process is performed completely in the dry state, which additionally minimises cleaning outlay. Therefore, a layer stack as described above can be deformed and cured in one provided tool. A separate supply of matrix material and fibre material is not required. The method thus has at the most two stages (depositing the layer stack and deforming same with curing) which reduces production costs.

An homogeneous distribution of the gelatine-containing matrix material is improved by virtue of the fact that the matrix material is melted prior to deformation. Melting occurs, depending upon the water content and the type and amount of supplements (e.g. softening agents or curing agents) of the gelatine at temperatures between 30 and 80° C., in particular at a temperature between 50° C. and 70° C. In the molten state, the matrix material can penetrate the fibre material in an extremely effective manner, which reinforces the fibre composite.

Curing advantageously occurs at a temperature of up to 300° C. The fibre composite moulded part thus obtains its final shape. The gelatine can react e.g. with optionally added curing agents during curing. In order to reduce process costs, curing is performed in particular at a temperature between 150° C. and 280° C. and further advantageously at about 200° C. Prior to curing, a drying step is preferably performed, in which initially the major proportion of bound water is removed from the matrix at 100 to 150° C. The subsequent curing step is preferably performed at 200° C. because the pyrolysis of anhydrous gelatine begins at about 210° C. (complete decomposition at 350 to 400° C.). Temperatures of up to 300° C. can be applied briefly between drying and curing in order to accelerate drying and curing.

The method in accordance with the invention is particularly suitable for producing carbon fibre composite moulded parts (CFK moulded parts), wherein photographic gelatine is particularly used as gelatine.

A fibre composite moulded part is likewise described in accordance with the invention. The fibre composite moulded part is formed in particular as a deep drawn fibre composite moulded part and includes a fibre material and a matrix material. A fibre material is understood herein to mean a single fibre material or also a mixture of different fibre materials. A gelatine-containing matrix material is used as the matrix material. A matrix material is understood herein to mean one which contains gelatine as the major component, relative to the total weight of the matrix material. The gelatine used in accordance with the invention can be obtained from connective tissue or from bone from different types of animal, in particular from the skin or bone of pigs or cows or even from poultry or fish. Further conventional matrix materials can be provided. However, the content thereof is preferably as low as possible. Furthermore, the matrix material can contain additives which e.g. stabilise the matrix material or facilitate the curing thereof, e.g. an addition of thermolabile curing agents. In a particularly preferred manner, a photographic gelatine is used as the gelatine. Photographic gelatine is known and optimised for large-scale industrial production of multi-ply layers and the reaction with chemical curing agents. Typical photographic gelatines used in accordance with the invention have an average molecular weight of about 100 000 to 200 000 Daltons, a so-called Bloom value (gel thickness) of about 260-280 g, a viscosity of more than 5 mPas and controlled calcium values of 0 to about 4000 ppm. Typically, photographic gelatines have high transmission values and therefore have a low inherent colour, which is advantageous for the production of fibre composite materials in the visual range of the user (e.g. visible carbon). The photographic gelatine can additionally be combined e.g. with so-called collagen peptides. These are hydrolysed gelatines having smaller molecular weights of about 1500 to 5000 Daltons. By adding these short-chain proteins, the penetration of the matrix material into the fibre material is improved.

The combination of gelatine as the major component of the matrix material and a fibre material produces an environmentally friendly, highly effectively biodegradable fibre composite moulded part which can be recycled and is safe and harmless to use from a toxicology point of view and in addition is cost-effective owing to the low raw material price for gelatine. Owing to the use of the renewable raw material gelatine, the fibre composite moulded part can furthermore be produced in a sustainable manner and thus has a high market acceptance.

It is noted that the previously described method is suitable for producing the fibre composite moulded part in accordance with the invention.

In an advantageous development of the fibre composite moulded part in accordance with the invention, provision is made that the matrix material consists of gelatine. This means that gelatine is present as a single matrix material, although conventional additives can be present. The biodegradability and capability of being recycling of the fibre composite moulded part is hereby maximised.

A carbon fibre material is used as the preferred fibre material because it is wetted extremely effectively by the gelatine-containing matrix material and thus a fibre composite moulded part having excellent mechanical properties is obtained.

The fibre composite moulded part is used in particular in automotive engineering and is formed in this case as a motor vehicle component. Further uses of the fibre composite moulded part in accordance with the invention include e.g. in aircraft and rail vehicle construction.

Furthermore, in accordance with the invention, the use of gelatine as the matrix material is also provided for the production of fibre composite moulded parts.

Further details, features and advantages of the invention will be apparent from the following description and the FIGURE, in which:

FIG. 1 shows a schematic representation of the method in accordance with an advantageous embodiment of the invention.

The present invention is explained in detail with the aid of an exemplified embodiment. FIG. 1 illustrates only the aspects of the method in accordance with the invention for producing a fibre composite moulded part which are of interest here, all other elements have been omitted for reasons of clarity.

FIG. 1 illustrates in detail a section through a deep drawing tool 10 which is used in this embodiment to produce a fibre composite moulded part. The deep drawing tool 10 includes two side tools 2 which hold a layer stack 1 therebetween and a stamp 3 which exerts a pressing force onto the layer stack 1 during movement in the direction of the arrow. The layer stack 1 is hereby urged into a deformation region 6 between the side tools 2. The layer stack 1 is thereby deformed and shaped into the desired final shape.

In this embodiment, the layer stack 1 consists of seven layers of a gelatine-containing matrix material 4 and six layers of a fibre material 5 which are arranged alternately stacked one above the other. Layers of the gelatine-containing matrix material 4 form the outer, surrounding layers. The gelatine-containing matrix material is advantageously in the form of a film.

The deep drawing tool 10 can be heated. Therefore, prior to the stamp 3 being lowered, the layer stack 1 can be heated to a temperature melting the gelatine-containing matrix material. The molten matrix material 4 then penetrates into the fibre material layers 5 and saturates same. By applying a pressing force onto the layer stack 1 by the stamp 3, deformation is possible, forming a homogeneous fibre composite moulded part in the desired shape.

By re-raising or further raising the temperature of the tool, the gelatine-containing matrix material is cured, whereby the fibre composite moulded part obtains its final, permanent shape.

The preceding description of the present invention is used merely for illustrative purposes and does not limit the invention. Various changes and modifications are possible within the framework of the invention without departing from the scope of the invention and equivalents thereof.

LIST OF REFERENCE NUMERALS

1 Layer stack
2 Side tool
3 Stamp
4 Layer of gelatine-containing matrix material
5 Layer of fibre material
6 Deformation region
10 Deep drawing tool

What is claimed is:

1. A method for producing a fibre composite moulded part, comprising the steps of:
  applying a gelatine-containing matrix material onto a fibre material, wherein the gelatine-containing matrix material contains photographic gelatine and at least one collagen peptide having a molecular weight of 1500 to 5000 Daltons,
  deforming the fibre material provided with matrix material, and
  curing the fibre material provided with matrix material, wherein curing is performed at a temperature between about 150° C. and 280° C.

2. The method as claimed in claim 1, wherein the gelatine-containing matrix material is applied in the form of a powder, solution, dispersion, or film.

3. The method as claimed in claim 1, wherein the gelatine-containing matrix material is applied onto the fibre material by alternating superimposed layers of fibre material layers and layers of gelatine-containing matrix material.

4. The method as claimed in claim 1, wherein deformation is performed by deep drawing.

5. The method as claimed in claim 1, wherein the matrix material is melted prior to deformation at 30° C. to 80° C. so that the matrix material penetrates the fibre material.

6. The method of claim 1, wherein the matrix material has low inherent colour.

7. A fibre composite moulded part comprising a fibre material and a matrix material, wherein the matrix material contains photographic gelatine and at least one collagen peptide having a molecular weight of 1500 to 5000 Daltons; and
  wherein the fibre composite moulded part is cured a temperature between about 150° C. and 280° C.

8. The fibre composite moulded part as claimed in claim 7, wherein the fibre material is a carbon fibre material.

9. The fibre composite moulded part as claimed in claim 7, wherein the matrix material has low inherent colour.

10. A method of using a matrix material comprised of photographic gelatine and at least one collagen peptide having a molecular weight of 1500 to 5000 Daltons to produce a fibre composite moulded part; and
  wherein the fibre composite moulded part is cured at a temperature between about 150° C. and 280° C.

11. The method of claim 10, wherein the fibre material is a carbon fibre material.

12. The method of claim 10, wherein the matrix material has low inherent colour.

* * * * *